(12) United States Patent
Becker-Willinger et al.

(10) Patent No.: US 7,799,432 B2
(45) Date of Patent: Sep. 21, 2010

(54) SUBSTRATES HAVING A BIOFILM-INHIBITING COATING

(75) Inventors: Carsten Becker-Willinger, Saarbrücken (DE); Helmut Schmidt, Saarbrücken (DE)

(73) Assignee: Leibniz-Institut Fuer Neue Materialien Gemeinnuetzige GmbH, Saarbrucken (DE)

( * ) Notice: Subject to any disclaimer, the term of this patent is extended or adjusted under 35 U.S.C. 154(b) by 499 days.

(21) Appl. No.: 10/969,008

(22) Filed: Oct. 21, 2004

(65) Prior Publication Data

US 2005/0159504 A1   Jul. 21, 2005

Related U.S. Application Data

(63) Continuation of application No. PCT/EP03/04341, filed on Apr. 25, 2003.

(30) Foreign Application Priority Data

Apr. 29, 2002   (DE) ................. 102 19 127

(51) Int. Cl.
*B32B 9/04* (2006.01)

(52) U.S. Cl. ............. 428/447; 106/287.11; 106/287.13; 106/287.14; 106/287.15

(58) Field of Classification Search ................. 428/447; 106/287.11, 287.13, 287.14, 287.15, 18.32, 106/15.05
See application file for complete search history.

(56) References Cited

U.S. PATENT DOCUMENTS

| | | | |
|---|---|---|---|
| 4,540,634 A * | 9/1985 | Ashlock et al. ............. 428/451 |
| 5,593,781 A | 1/1997 | Nass et al. |
| 5,644,014 A * | 7/1997 | Schmidt et al. ............. 528/43 |
| 5,731,091 A * | 3/1998 | Schmidt et al. ............. 428/428 |
| 5,766,680 A | 6/1998 | Schmidt et al. |
| 6,291,070 B1 | 9/2001 | Arpac et al. |
| 6,358,516 B1 * | 3/2002 | Harod ................. 424/401 |
| 6,476,095 B2 | 11/2002 | Simendinger, III |
| 6,485,838 B1 | 11/2002 | Shimada et al. |
| 6,559,201 B2 | 5/2003 | Simendinger, III |
| 6,585,989 B2 * | 7/2003 | Herbst et al. ................. 424/404 |
| 6,630,205 B2 * | 10/2003 | Brueck et al. ............... 427/387 |
| 6,716,895 B1 * | 4/2004 | Terry ......................... 523/122 |
| 7,279,173 B2 * | 10/2007 | Schiestel et al. ............. 424/421 |
| 2002/0010228 A1 | 1/2002 | Simendinger, III |
| 2002/0013385 A1 | 1/2002 | Simendinger, III |

FOREIGN PATENT DOCUMENTS

| | | | |
|---|---|---|---|
| DE | 195 44 763 | * | 6/1997 |
| DE | 19935230 | | 2/2001 |
| DE | 199 58 336 | * | 6/2001 |
| DE | 100 54 248 | * | 5/2002 |
| EP | 1054047 | | 11/2000 |
| JP | 2001/181862 | | 7/2001 |
| WO | 92/21729 | | 12/1992 |
| WO | 93/21127 | | 10/1993 |
| WO | 95/31413 | | 11/1995 |
| WO | 98/51747 | | 11/1998 |

OTHER PUBLICATIONS abstract JP 2000 109344, Apr. 18, 2000.*
English language translation (machine generated) JP 2000 109344, Apr. 18, 2000.*
abstract JP 2002 226232 Aug. 14, 2002.*
abstract JP 2000 143298 May 23, 2000.*
English language abstract JP 04321628, Nov. 11, 1992.*
English language translation DE 195 44 763 Jun. 5, 1997.*
English language translation JP 03122162, May 24, 1991.*
English Language Abstract of DE 19935230.
C.J. Brinker, G.W. Scherer: "Sol-Gel Science—The Physics and Chemistry of Sol-Gel Processing", Academic Press, Boston, San Diego, New York, London, Sydney, Tokyo, Toronto (1990), pp. 108-115.
English language Abstract of JP 2001/181862 A.

* cited by examiner

*Primary Examiner*—Margaret G Moore
(74) *Attorney, Agent, or Firm*—Greenblum and Bernstein P.L.C.

(57) ABSTRACT

Substrates with a biofilm-inhibiting coating comprising an inorganic condensate modified with organic groups, at least some of the organic groups of the condensate containing fluorine atoms and the coating comprising copper colloids or silver colloids.

56 Claims, No Drawings

SUBSTRATES HAVING A BIOFILM-INHIBITING COATING

CROSS-REFERENCE TO RELATED APPLICATIONS

The present application is a continuation of International Application No. PCT/EP03/04341, filed Apr. 25, 2003, the entire disclosure whereof is expressly incorporated by reference herein, which claims priority under 35 U.S.C. §119 of German Patent Application 102 19 127.1, filed Apr. 29, 2002.

BACKGROUND OF THE INVENTION

1. Field of the Invention

The present invention relates to substrates having a biofilm-inhibiting coating, to processes for producing them and to their use.

2. Discussion of Background Information

Articles are exposed to the microorganisms which are almost always present in the environment, such as bacteria, fungi, yeasts, algae and lichens. The infestation or overgrowth of articles with these microorganisms causes enormous economic damage, as a result, for example, of secretion of enzymes or mechanical stress, a biofilm of this kind has material-destroying properties. Additionally there is a risk of contamination of other articles or media which come into contact with an article bearing a biofilm or which even are only located in the vicinity of such an article. Consequently all applications which require high cleanliness are particularly sensitive to such biofilms. The health risk due to pathogens in the biofilm necessitates particular precautionary rules.

In view of the economic significance there are numerous measures for as far as possible avoiding the formation of such biofilms on articles and on substrates in general. This purpose is served in particular using microbicidal substances, with which the substrates are sprayed from time to time or which are used in coatings on the substrate.

SUMMARY OF THE INVENTION

The present invention provides a substrate that comprises a biofilm-inhibiting coating. This coating comprises (a) an inorganic condensate that is modified with organic groups, at least some of these organic groups comprising fluorine atoms, and (b) a copper colloid and/or a silver colloid.

In one aspect of the substrate, the coating may comprise a silver colloid.

In another aspect, the inorganic condensate may comprise one or more of Si, Al, B, Sn, Ti, Zr, V and Zn and, preferably, at least one of Si, Al, Ti and Zr.

In yet another aspect, the organic groups may comprise at least one fluorinated alkyl group having from 3 to 20 carbon atoms, for example, at least one group selected from $CF_3CH_2CH_2$, $C_2F_5CH_2CH_2$, n-$C_6F_{13}CH_2CH_2$, iso-$C_3F_7OCH_2CH_2CH_2$, n-$C_8F_{17}CH_2CH_2$ and n-$C_{10}F_{21}$—$CH_2CH_2$.

In a still further aspect, the coating may further comprise nanoscale inorganic particles which are different from the copper and silver colloids. Preferably, the nanoscale inorganic particles may comprise one or more of $SiO_2$, $Al_2O_3$, ITO, ATO, AlOOH, $ZrO_2$ and $TiO_2$ and/or the nanoscale inorganic particles may have a particle size of from 2 nm to 50 nm.

In another aspect, the substrate of the present invention may further comprise a base coat beneath the biofilm-inhibiting coating and/or the coated surface of the substrate may comprise at least one of metal, rock, wood, paper, textiles, leather, ceramic, glass, enamel, rubber and plastic.

In yet another aspect, the coating may have a thickness of from 1 μm to 15 μm.

The present invention also provides a process for producing a substrate having a biofilm-inhibiting coating. This process comprises applying a coating composition to at least a part of the surface of the substrate and subjecting the applied coating composition to heat and/or radiation. The coating composition comprises a fluorine-containing hydrolysate and/or a fluorine-containing precondensate of one or more hydrolyzable inorganic compounds which comprise at least one non-hydrolyzable organic substituent. The coating composition also comprises (i) a colloid of silver and/or a colloid of copper and/or (ii) one or more compounds of silver and/or copper that are converted to (i) when the coating composition is subjected to heat and/or radiation.

In one aspect of the process, the coating composition may be subjected to heat. In another aspect, it may be subjected to radiation. The radiation may comprise UV radiation and/or blue light.

In another aspect of the process, the coating composition may be applied in an amount which results in a dry thickness of the biofilm-inhibiting coating of from 2 μm to 5 μm.

The present invention also provides a coating composition for forming a biofilm-inhibiting coating on a substrate. This coating composition comprises a hydrolysate and/or a precondensate of one or more hydrolyzable inorganic compounds which comprise at least one non-hydrolyzable organic substituent. The coating composition also comprises (i) a colloid of silver and/or a colloid of copper and/or (ii) one or more compounds of silver and/or copper that are capable of being converted to (i) when subjected to heat and/or radiation.

In one aspect of the coating composition, the hydrolyzable inorganic compounds may comprise one or more hydrolyzable silanes. For example, the hydrolyzable inorganic compounds may comprise one or more silanes of formula (I)

$$R_aSiX_{(4-a)} \qquad (I)$$

in which the radicals R are identical or different and represent non-hydrolyzable groups, the radicals X are identical or different and represent at least one of hydrolyzable groups and hydroxyl groups, and a has a value of 1, 2 or 3; and/or the hydrolyzable inorganic compounds may comprise one or more fluorosilanes of formula (II)

$$Rf(R)_bSiX_{(3-b)} \qquad (II)$$

in which the radicals R are identical or different and represent non-hydrolyzable groups, the radicals X are identical or different and represent at least one of hydrolyzable groups and hydroxyl groups, Rf is a non-hydrolyzable group comprising 1 to 30 fluorine atoms attached to aliphatic carbon atoms, and b is 0, 1 or 2.

In another aspect of the coating composition of the present invention, the hydrolyzable inorganic compounds may comprise one or more silanes that comprise at least one non-hydrolyzable radical with a functional group, the functional group being capable of participating in a crosslinking reaction. By way of non-limiting example, the functional group may comprise a carbon-carbon double bond.

In yet another aspect, the coating composition may comprise a fluorine-containing hydrolysate and/or a fluorine-containing precondensate of at least one hydrolyzable inorganic compound that comprises at least one non-hydrolyzable organic substituent. For example, the non-hydrolyzable organic substituent may comprise at least one fluorinated alkyl group that comprises from 3 to 20 carbon atoms, e.g., a $CF_3CH_2CH_2$, $C_2F_5CH_2CH_2$, n-$C_6F_{13}CH_2CH_2$, iso-$C_3F_7OCH_2CH_2CH_2$, n-$C_8F_{17}CH_2CH_2$ and/or n-$C_{10}F_{21}$—$CH_2CH_2$ group.

In yet another aspect, the coating composition may comprise one or more compounds of silver and/or copper that can be converted into a copper colloid/silver colloid. For example, the coating composition may comprise one or more complex compounds of copper/silver. These complex compounds may comprise, for example, at least one chelate complex compound such as, e.g., a copper diamine complex compound and/or a silver diamine complex compound, preferably at least a silver diamine complex compound. In another aspect, the complex compound(s) may comprise at least one aminosilane.

In a still further aspect of the coating composition of the present invention, the hydrolysate and/or precondensate thereof may comprise one or more of Si, Al, B, Sn, Ti, Zr, V and Zn, preferably at least one of Si, Al, Ti and Zr.

In another aspect, the coating composition may further comprise nanoscale inorganic particles which are different from the silver/copper colloid. By way of non-limiting example, the nanoscale inorganic particles may comprise at least one of $SiO_2$, $Al_2O_3$, ITO, ATO, AlOOH, $ZrO_2$ and $TiO_2$. In another aspect, the nanoscale inorganic particles may have a particle size of from 1 nm to 100 nm, for example, a particle size of from 5 nm to 20 nm. In yet another aspect, the nanoscale inorganic particles may be present in an amount of from 1% to 30% by weight, based on the solids content of the coating composition.

In a still further aspect, the coating composition may further comprise an organic crosslinking agent. Preferably, the organic crosslinking agent comprises at least two groups selected from acryloyloxy, methacryloyloxy, glycidyloxy, epoxide, hydroxyl and amino groups.

The biofilm-inhibiting coating of the present invention is extremely effective. As set forth above, the substrate of the present invention has a coating comprising an inorganic condensate modified with organic groups, at least some of the organic groups of the condensate containing fluorine atoms and the coating comprising copper colloids or silver colloids.

When the surface of a substrate is coated with a coating material of this kind the formation of the biofilm on the substrate is significantly inhibited or prevented entirely. The biofilm suppression in this case is surprisingly much more effective than with conventional coatings containing, say, microbicidal silver compounds. Apparently the combination of condensates with fluorine-containing organic groups and the presence of copper or silver colloids in the coating affords an unexpected synergy in respect of the biofilm inhibition effect.

The substrate can be any commonplace material. Examples are metal, rock, wood, paper, textiles, leather, ceramic, glass, enamel, rubber or plastic. Metal includes metal alloys, and examples are steel, including stainless steel, chromium, copper, titanium, tin, zinc, brass and aluminum. Examples of plastic materials are polymethyl methacrylate (PMMA), polyethylene, polypropylene, polyacrylates such as polymethyl acrylate, polyvinylbutyral and polycarbonate. Examples of glass include float glass, borosilicate glass, lead crystal and silica glass. The paper and the textiles may be composed of plant, animal or synthetic fibers. Rock encompasses natural stone, such as marble, granite or sandstone, and artificial stone, such as concrete and mortar.

The coating is suitable in principle for any substrates and/or articles. The article may be composed of one material or of two or more parts made from different materials. The article may have at least in part a surface layer to be coated. The biofilm-inhibiting coating can be applied to the entire surface of the substrate. Alternatively, where needed, only parts of the substrate may be provided with the coating. This may be a result, for example, of the fact that these parts are particularly heavily exposed to the microorganisms (boat hull) or that for these parts a biofilm is particularly undesirable (interior wall of food containers).

The substrate may be pretreated in conventional manner, in order for example to achieve cleaning, degreasing or improved adhesion with the coating. The substrate may have been provided with a surface layer by means, for example, of metallizing, enameling or varnishing. Frequently it is advantageous to provide the substrate with a primer coat formed from a conventional coating material.

Of course, if only part of the substrate is to be coated, the part of the substrate to be coated can first be coated separately and then assembled to form the finished article. The coating can be obtained by applying a below-described coating composition to the substrate and treating it with heat and/or radiation. Preference is given to using a photocuring coating composition.

The coating composition (coating material) used comprises a hydrolysate or precondensate based on one or more inorganic hydrolyzable compounds with at least one non-hydrolyzable substituent. The non-hydrolyzable substituent is in particular an organic substituent (containing carbon), at least some of the organic groups of the condensate containing fluorine atoms. Preferably the coating composition comprises at least one hydrolyzable silane with at least one non-hydrolyzable substituent as hydrolyzable compound.

The hydrolysate or precondensate is preferably obtained by partial hydrolysis or condensation of one or more silanes of formula (I)

$$R_aSiX_{(4-a)} \tag{I}$$

in which the radicals R are identical or different and represent non-hydrolyzable groups, the radicals X are identical or different and denote hydrolyzable groups or hydroxyl groups and a has the value 1, 2 or 3, a value of 1 being preferred.

In the case of the organosilanes of formula (I) the hydrolyzable groups X are, for example, hydrogen or halogen (F, Cl, Br or I, especially Cl and Br), alkoxy (preferably $C_{1-6}$ alkoxy, especially $C_{1-4}$ alkoxy, such as methoxy, ethoxy, n-propoxy, isopropoxy, n-butoxy, isobutoxy, sec-butoxy and tert-butoxy), aryloxy (preferably $C_{6-10}$ aryloxy, such as phenoxy), acyloxy (preferably $C_{1-6}$ acyloxy, such as acetoxy or propionyloxy), alkylcarbonyl (preferably $C_{2-7}$ alkylcarbonyl, such as acetyl), amino, monoalkylamino or dialkylamino, the alkyl groups having preferably 1 to 12, in particular 1 to 6, carbon atoms. Preferred hydrolyzable radicals are halogen, alkoxy groups and acyloxy groups. Particularly preferred hydrolyzable radicals are alkoxy groups, especially methoxy and ethoxy.

R is a non-hydrolyzable organic radical which optionally may carry a functional group. Examples of R are alkyl (e.g., $C_{1-20}$ alkyl, preferably $C_{1-6}$ alkyl, such as methyl, ethyl, n-propyl, isopropyl, n-butyl, s-butyl and tert-butyl, pentyl, hexyl or cyclohexyl), alkenyl (e.g., $C_{2-20}$ alkenyl, preferably $C_{2-6}$ alkenyl, such as vinyl, 1-propenyl, 2-propenyl and butenyl), alkynyl (e.g., $C_{2-20}$ alkynyl, preferably $C_{2-6}$ alkynyl, such as acetylenyl and propargyl) and aryl (preferably $C_{6-10}$ aryl, such as phenyl and naphthyl).

Specific examples of functional groups of the radical R include, in addition to the groups already mentioned above containing unsaturated C—C bonds, epoxy, hydroxyl, ether, amino, monoalkylamino, dialkylamino, with for example the above-defined $C_{1-6}$ alkyl groups, amide, carboxyl, mercapto, thioether, vinyl, isocyanate, acryloyloxy, methacryloyloxy, acid anhydride, acid halide, cyano, halogen, aldehyde, alkylcarbonyl, sulfonic acid and phosphoric acid groups. These functional groups are attached to the silicon atom via divalent bridging groups, e.g., alkylene, alkenylene or arylene bridging groups, which may be interrupted by oxygen or sulfur atoms or by —NH— groups. Said bridging groups derive for example from the above-mentioned alkyl, alkenyl or aryl radicals. The radicals R contain preferably 1 to 18, in particular 1 to 8, carbon atoms. The stated radicals R and X may optionally have one or more customary substituents, such as halogen or alkoxy.

In one preferred embodiment at least one of the hydrolyzable silanes with at least one non-hydrolyzable substituent that are used contains one of the above-mentioned functional groups on the non-hydrolyzable substituent. By way of this functional group it is then possible for crosslinking to take place; for example, by reaction of the functional groups on the silanes with one another, in which case identical or different functional groups may react with one another, or with functional groups on the organic compounds described below, which may likewise be present in the coating composition. Crosslinking via the functional groups leads to curing via the organic groups present in the condensate (organic crosslinking).

Preferred functional groups are carbon-carbon double bonds and also epoxide, acid anhydride and amino groups, the use of carbon-carbon double bonds as functional group being particularly preferred.

The compounds with carbon-carbon double bonds as functional group that are used are, in particular, silanes of formula (I) in which the radical R contains a reactive polymerizable double bond. Such a compound is preferably a silane of the formula (I) in which X and a are as defined above (X is preferably methoxy or ethoxy, a is preferably 1) and R is a non-hydrolyzable radical, e.g., an aliphatic, cycloaliphatic or aromatic radical, especially alkylene, e.g., $C_1$-$C_6$ alkylene, such as methylene, ethylene, propylene and butylene, with a vinyl, (meth)acryloyl or (meth)acryloyloxy group. The radical R is preferably a (meth)acryloyloxy-($C_{1-6}$)-alkylene radical such as, for example, (meth)acryloyloxypropyl. Specific examples are vinyltriethoxysilane, vinyltrimethoxysilane, methacryloyloxypropyltrimethoxysilane (MPTS), methacryloyloxy-propyltriethoxysilane, acryloyloxypropyltrimethoxysilane and acryloxypropyltriethoxy-silane.

Examples of silanes containing an epoxide group are epoxysilanes of the above general formula (I) in which a has a value of 1, X is preferably $C_{1-4}$ alkoxy, more preferably methoxy and ethoxy, and R is a non-hydrolyzable radical containing at least one epoxide group, e.g., an aliphatic, cycloaliphatic or aromatic radical, especially alkylene, e.g., $C_1$-$C_6$ alkylene, such as methylene, ethylene, propylene and butylene, with at least one epoxide group. The radical R is preferably a glycidyloxy-($C_{1-6}$)-alkylene radical such as, for example, γ-glycidyloxypropyl. Examples are γ-glycidyloxypropyltrimethoxysilane (GPTS) and γ-glycidyloxypropyltriethoxysilane (GPTES).

Examples of aminosilanes are those of the above formula (I) in which a has a value of 1, X is preferably $C_{1-4}$ alkoxy, more preferably methoxy and ethoxy, and R is a non-hydrolyzable radical containing at least one amino group, e.g., an aliphatic, cycloaliphatic, or aromatic radical, especially alkylene, e.g., $C_1$-$C_6$ alkylene, such as methylene, ethylene, propylene and butylene, with at least one primary, secondary or tertiary amino group. R for example is a radical $R^1_2$N-(alkylene-NR$^1$)$_x$-alkylene in which x is 0 to 5, the alkylene groups can be identical or different and in particular can be those specified above, and $R^1$ is identical or different and is hydrogen or an optionally substituted alkyl radical, examples being those specified in general formula (I) above. $R^1$ may also be a divalent radical, e.g., alkylene, forming a heterocyclic ring. If desired it is also possible for a further non-hydrolyzable radical to be present, alkyl for example (a=2). Specific examples of such silanes are 3-aminopropyltrimethoxysilane (APTS), 3-aminopropyltriethoxysilane, N-(2-aminoethyl)-3-aminopropyltrimethoxysilane, N-[N'-(2'-aminoethyl)-2-aminoethyl]-3-aminopropyltrimethoxysilane, N-[3-(triethoxysilyl)-propyl]-4,5-dihydroimidazole and [N-(2-aminoethyl)-3-aminopropyl]methyldiethoxy-silane.

Examples of anhydridosilanes are those of the above formula (I) in which a has a value of 1, X is preferably $C_{1-4}$ alkoxy, more preferably methoxy and ethoxy, and R is a non-hydrolyzable radical containing at least one anhydride group, e.g., an aliphatic, cycloaliphatic or aromatic radical, especially alkylene, e.g., $C_1$-$C_6$ alkylene, especially $C_1$-$C_4$ alkylene, such as methylene, ethylene, propylene and butylene, with an anhydride group. The anhydride group which, like the epoxide group, is capable of condensation with amino groups may comprise, for example, radicals deriving from carboxylic anhydrides, such as succinic anhydride, maleic anhydride or phthalic anhydride, which are connected to the silicon atom via one of the aforementioned radicals, especially $C_1$-$C_4$ alkylene. Examples are [3-(triethoxysilyl)propyl]succinic anhydride(dihydro-3-(3-triethoxysilyl)propyl)-2,5-furandione, GF20) and [3-(tri-methoxysilyl)propyl] succinic anhydride.

According to the invention at least some of the organic groups of the inorganic condensate in the biofilm-inhibiting coating are substituted by fluorine. To this end the hydrolyzable compounds used in the coating composition comprise one or more hydrolyzable silanes containing at least one fluorine-bearing, non-hydrolyzable group. Silanes of this kind are described in detail, for example, in WO 92/21729 or in DE 4118184, hereby incorporated by reference. The use of a fluorinated silane of this kind results in hydrophobic and oleophobic properties of the coating.

Use is made for this purpose preferably of hydrolyzable silane compounds having at least one non-hydrolyzable radical of formula $$Rf(R)_b SiX_{(3-b)} \quad (II)$$

in which X and R are as defined in formula (I), Rf is a non-hydrolyzable group containing 1 to 30 fluorine atoms attached to aliphatic carbon atoms and preferably separated from Si by at least two atoms, preferably an ethylene group, and b is 0, 1 or 2. R is in particular a radical without a functional group, preferably an alkyl group such as methyl or ethyl. Preferably the groups Rf contain at least 2, 3, 5 or 8 fluorine atoms and not more than 25, 21 or 18 fluorine atoms which are attached to aliphatic (including cycloaliphatic) carbon atoms. Rf is preferably a fluorinated alkyl group having 3 to 20 carbon atoms and examples are $CF_3CH_2CH_2$, $C_2F_5CH_2CH_2$, n-$C_6F_{13}CH_2CH_2$, iso-$C_3F_7OCH_2CH_2$, n-$C_8F_{17}CH_2CH_2$ and n-$C_{10}F_{21}$—$CH_2CH_2$.

Fluorine atoms which optionally are attached to aromatic carbon atoms (e.g., in the case of $C_6F_4$) are not taken into account. The fluorine-bearing group Rf may also be a chelate ligand. It is likewise possible for one or more fluorine atoms to be located on a carbon atom that is the starting point for a double or triple bond. Examples of fluorosilanes which can be used are $CF_3CH_2CH_2SiCl_2(CH_3)$, $CF_3CH_2CH_2SiCl(CH_3)_2$, $CF_3CH_2CH_2Si(CH_3)(OCH_3)_2$, $C_2F_5$—$CH_2CH_2$—$SiZ_3$, n-$C_6F_{13}$—$CH_2CH_2SiZ_3$, n-$C_8F_{17}$—$CH_2CH_2$—$SiZ_3$, n-$C_{10}F_{21}$—$CH_2CH_2$—$SiZ_3$, in which $Z$=$OCH_3$, $OC_2H_5$ or Cl; iso-$C_3F_7O$—$CH_2CH_2CH_2$—$SiCl_2(CH_3)$, n-$C_6F_{13}$—$CH_2CH_2$—$Si(OCH_2CH_3)_2$, n-$C_6F_{13}$—$CH_2CH_2$—$SiCl_2(CH_3)$ and n-$C_6F_{13}$—$CH_2CH_2$—$SiCl(CH_3)_2$.

Commonly not less than 0.1 mol %, in particular not less than 0.5 mol %, preferably not less than 1 mol %, more preferably not less than 2 mol % and most preferably not less than 4 mol %, and also commonly 100 mol % or less, in particular not more than 50 mol %, preferably not more than 30 mol % and more preferably not more than 15 mol %, of all of the non-hydrolyzable groups of the hydrolyzable compounds used in the coating composition are groups containing one or more fluorine atoms. In one preferred embodiment, especially if silver colloids are present in the coating, the fraction of fluorinated silanes is more than 2% by weight, in particular more than 2.5% by weight, based on all of the monomers of the inorganic condensate.

Of the hydrolyzable silanes containing at least one non-hydrolyzable substituent used for the hydrolysate or precondensate preferably at least 40 mol %, preferably at least 70 mol %, more preferably at least 90 mol %, have at least one functional group on at least one non-hydrolyzable substituent. In one preferred embodiment, with the exception of any fluorine-containing silanes used, all other hydrolyzable silanes used that have at least one non-hydrolyzable substituent possess, on at least one non-hydrolyzable substituent, at least one functional group via which crosslinking is possible.

For the preparation of the hydrolyzate or precondensate it is possible if desired to use further hydrolyzable compounds of an element M, without non-hydrolyzable groups, as matrix formers. These are, in particular, compounds of glass-forming or ceramic-forming elements, especially compounds of at least one element M from main groups III to V and/or transition groups II to IV of the Periodic Table of the Elements. Preferably the compounds in question are hydrolyzable compounds of Si, Al, B, Sn, Ti, Zr, V or Zn, particularly those of Si, Al, Ti or Zr, or of mixtures of two or more of these elements. Of course, other hydrolyzable compounds can be used as well, particularly those of elements of main groups I and II of the periodic table (e.g., Na, K, Ca and Mg) and of transition groups V to VIII of the Periodic Table (e.g., Mn, Cr, Fe and Ni). Hydrolyzable compounds of the lanthanides can also be used. Preferably, however, these hydrolyzable compounds without a non-hydrolyzable group make up not more than 40 mol % and in particular not more than 20 mol % and especially 0 mol % of the hydrolyzable monomeric compounds used overall. When highly reactive hydrolyzable compounds (aluminum compounds, for example) are employed it is advisable to use complexing agents, which prevent spontaneous precipitation of the corresponding hydrolyzates on addition of water. WO 92/21729 specifies suitable complexing agents which can be used for reactive hydrolyzable compounds.

These compounds are in particular of formula $MX_n$, in which M is the above-defined element, X is defined as in formula (I), it being possible for two groups X to be replaced by an oxo group, and n corresponds to the valence of the element and is generally 3 or 4. Preference is given to using alkoxides of Si, Zr and Ti. Coating compositions based on hydrolyzable compounds with non-hydrolyzable groups and hydrolyzable compounds without non-hydrolyzable groups are described, for example, in WO 95/31413 (DE 4417405), hereby incorporated by reference.

Particularly suitable additional compounds without non-hydrolyzable groups are hydrolyzable silanes of the formula $$SiX_4 \quad (III)$$

where X is defined as in formula (I). Specific examples are $Si(OCH_3)_4$, $Si(OC_2H_5)_4$, $Si(O$-n- or iso-$C_3H_7)_4$, $Si(OC_4H_9)_4$, $SiCl_4$, $HSiCl_3$ and $Si(OOCC_3H)_4$. Of these silanes, particular preference is given to tetramethoxysilane and tetraethoxysilane.

The biofilm-inhibiting coating further comprises copper colloids or, preferably, silver colloids. For this purpose it is possible to introduce corresponding copper or silver colloids into the coating composition so that following application of the coating composition and drying and/or curing a coating comprising copper or silver colloids in the inorganic condensate matrix modified with organic groups is formed.

The copper or silver colloids, however, are preferably formed in situ in the coating composition from copper compounds or silver compounds. This can be done by treatment with heat and/or radiation, the treatment taking place before application or, preferably, after application of the coating composition, in other words together with the drying and/or curing of the coating, or before and after application.

The coating composition in this case comprises at least one copper compound or silver compound. The compounds in question may be compounds of copper or silver that are soluble in water or organic solvents, e.g., $AgNO_3$ or $CuSO_4$, but preferably the copper ions or silver ions are used in the form of complex compounds and, in particular, chelate complex compounds. The copper or silver(I) ions and/or the copper or silver complex compounds can react under reducing conditions to form metal colloids. Examples of complexing agents which form a copper or silver complex compound with copper or silver(I) ions are halide ions, such as iodide, bromide and especially chloride (or the corresponding hydrohalic acids), thio compounds, thiocyano compounds, sugars, such as pentoses and hexoses, e.g., glucose, β-dicarbonyl compounds, such as diketones, e.g., acetylacetonates, keto esters, e.g., ethyl acetoacetate and allyl acetoacetate, ether alcohols, carboxylic acids, carboxylates, e.g., acetate, citrate or glycolate, betaines, diols, polyols, including polymeric polyols, such as polyalkylene glycols, crown ethers, phosphorus compounds and amino compounds. Particular preference is given to using amino compounds, such as aminosilanes, mono-, di-, tri- and tetraamines and higher polyamines, as complexing agents. Examples of organic amines are triethylenetetramine, diethylenetriamine and ethylenediamine. Examples of aminosilanes are 3-aminopropyltri(m)ethoxysilane and in particular 2-aminoethyl-3-aminopropyltrimethoxysilane (DIAMO), 2-aminoethyl-3-aminopropyltriethoxysilane, aminohexyl-3-aminopropyltrimethoxysilane and aminohexyl-3-aminopropyltriethoxy-silane. It is preferred to use copper diamine or silver diamine complex compounds, with particular suitability being possessed by complexing agents having at least two amino groups that are able to form chelate complexes. Among the amino complexing agents the aminosilanes are particularly preferred. They are incorporated advantageously into the matrix as it forms, which may contribute to stabilizing the copper or silver colloids.

When a complexing agent is used the stoichiometric ratio of Cu and/or Ag to complexing moieties present is preferably from 1:0.1 to 1:500, in particular from 1:1 to 1:200. The complexing agent may also function at least partly as a reducing agent for the copper or silver ions. Additionally, where appropriate, the solvents described below, e.g., alcohols or ketones, the by-products formed in the hydrolysis and condensation, e.g., alcohols, the hydrolyzable compounds employed, or a combination thereof, may be suitable reducing agents.

The coating composition can in one preferred embodiment additionally comprise nanoscale inorganic particulate solids, other than silver or copper colloids, which result in increased mechanical strength (scratch resistance, hardness) of the coating. Since in prolonged service possible scratches, owing to the unevenness, may promote the formation of biofilm, these nanoparticles likewise support the biofilm inhibition characteristics.

They generally possess a particle size in the range from 1 to 300 nm or 1 to 100 nm, preferably from 2 to 50 nm and more preferably from 5 to 20 nm. This material can be used in the form of a powder, but is preferably used in the form of a stabilized sol, in particular an acidically or alkalinically stabilized sol. The nanoscale inorganic particulate solids may be composed of any desired inorganic materials, but in particular are composed of metals or metal compounds such as, for example, (optionally hydrated) oxides, such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$, chalcogenides, nitrides, phosphides, phosphates, silicates, zirconates, aluminates or carbides. The nanoscale inorganic particulate solids preferably comprise an oxide, oxide hydrate, nitride or carbide of Si, Al, B, Zn, Cd, Ti, Zr, Ce, Sn, In, La, Fe, Cu, Ta, Nb, V, Mo or W, more preferably of Si, Al, B, Ti and Zr. Particular preference is given to using oxides and/or oxide hydrates. Preferred nanoscale inorganic particulate solids are $SiO_2$, $Al_2O_3$, ITO, ATO, AlOOH, $ZrO_2$ and $TiO_2$. Examples of nanoscale $SiO_2$ particles are commercially customary silica products, e.g., silica sols, such as the Levasils®, silica sols from Bayer AG, or pyrogenic silicas, e.g., the Aerosil products from Degussa.

The nanoscale inorganic particulate solids may be nanoscale inorganic particulate solids modified with organic surface groups. The surface modification of nanoscale particulate solids is a known method, as is described, for example, in WO 93/21127 (DE 4212633) and WO 98/51747 (DE 19746885).

The nanoscale inorganic particulate solids can be used in an amount of from 1% up to 50% by weight, based on the solid components of the coating composition. In general the amount of nanoscale inorganic particulate solids is in the range from 1 to 30% by weight.

The coating composition may further comprise additives which are normally added in the art in accordance with the purpose and with desired properties. Specific examples thereof are organic compounds, crosslinking agents, solvents, organic and inorganic color pigments, dyes, UV absorbers, lubricants, leveling agents, wetting agents, adhesion promoters and initiators. The initiator may serve for thermally or photochemically induced crosslinking.

If desired it is possible to add organic compounds and/or crosslinking agents to the coating composition. These may be organic monomers, oligomers or polymers containing in particular at least two functional groups which are able to react with the functional groups of the hydrolyzable silanes used, to form organic crosslinks. The compounds in question are, for example, aliphatic, cycloaliphatic or aromatic compounds. It is preferred to use organic compounds having at least two carbon-carbon double or triple bonds, at least two epoxide groups or at least two amino groups, particular preference being given to carbon-carbon double bonds. Examples of organic compounds of this kind are compounds containing at least two acryloyloxy, methacryloyloxy, glycidyloxy, epoxide, hydroxyl and/or amino groups. The organic compound is used preferably in an amount of not more than 30% by weight, based on the solids content of the coating composition.

Examples of organic compounds having at least two carbon-carbon double bonds are 1,6-hexanediol dimethacrylate, 1,6-hexanediol diacrylate, bisphenol A bisacrylate, bisphenol A bismethacrylate, trimethylolpropane triacrylate, trimethylol-propane trimethacrylate, neopentyl glycol dimethacrylate, neopentyl glycol diacrylate, diethylene glycol diacrylate, diethylene glycol dimethacrylate, triethylene glycol diacrylate, diethylene glycol dimethacrylate, tetraethylene glycol diacrylate, tetraethylene glycol dimethacrylate, polyethylene glycol diacrylate, polyethylene glycol dimethacrylate, 2,2,3,3-tetrafluoro-1,4-butanediol diacrylate and dimethacrylate, 1,1,5,5-tetrahydroperfluoropentyl 1,5-diacrylate and 1,5-dimeth-acrylate, hexafluorobisphenol A diacrylate and dimethacrylate, octafluorohexane-1,6-diol diacrylate and dimethacrylate, 1,3-bis(3-methacryloyloxypropyl)tetrakis(trimethyl-siloxy)disiloxane, 1,3-bis(3-acryloyloxypropyl)tetrakis(trimethylsiloxy)disiloxane, 1,3-bis(3-methacryloyloxypropyl)tetramethyldisiloxane and 1,3-bis(3-acryloyloxypropyl)tetramethyldisiloxane.

Organic epoxide compounds which can be used may derive, for example, from aliphatic, cycloaliphatic or aromatic esters or ethers or mixtures thereof, based for example on ethylene glycol, 1,4-butanediol, propylene glycol, 1,6-hexanediol, cyclohexanedimethanol, pentaerythritol, bisphenol A, bisphenol F or glycerol. Specific examples of organic compounds containing at least two epoxide groups are 3,4-epoxycyclohexylmethyl 3,4-epoxycyclohexanecarboxylate, bis(3,4-epoxycyclo-hexyl)adipate, 1,4-butanediol glycidyl ether, cyclohexanedimethanol diglycidyl ether, glycerol triglycidyl ether, neopentyl glycol diglycidyl ether, pentaerythritol polyglycidyl ether, 2-ethylhexyl glycidyl ether, 1,6-hexanediol diglycidyl ether, propylene glycol diglycidyl ether, polypropylene glycol diglycidyl ether, bisphenol A diglycidyl ether, bisphenol F diglycidyl ether, epoxy resins based on bisphenol A, epoxy resins based on bisphenol F and epoxy resins based on bisphenol A/F. Specific examples of organic compounds containing at least two amino groups are 1,3-diaminopentane, 1,5-diamino-2-methylpentane, 1,4-diaminocyclohexane, 1,6-diaminohexane, diethylenediamine, triethylenetetramine or isophoronediamine. Organic compounds which carry different functional groups can of course also be used.

Suitable (crosslinking) initiators include all of the initiators/initiating systems known to the skilled worker, including free-radical photoinitiators, free-radical thermal initiators, cationic photoinitiators, cationic thermal initiators, and any desired combinations thereof.

Specific examples of free-radical photoiniators which can be used are Irgacure® 184 (1-hydroxycyclohexyl phenyl ketone), Irgacure® 500 (1-hydroxycyclohexyl phenyl ketone, benzophenone) and other Irgacure®-type photoinitiators available from Ciba-Geigy; Darocur® 1173, 1116, 1398, 1174 and 1020 (available from Merck); benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Examples of free-radical thermal initiators include organic peroxides in the form of diacyl peroxides, peroxydicarbonates, alkyl peresters, alkyl peroxides, perketals, ketone peroxides and alkyl hydroperoxides and also azo compounds.

Specific examples that might be mentioned here include in particular dibenzoyl peroxide, tert-butyl perbenzoate and azobisisobutyronitrile.

An example of a cationic photoinitiator is Cyracure® UVI-6974, while a preferred cationic thermal initiator is 1-methylimidazole.

These initiators are used in the customary amounts known to those of skill in the art, preferably 0.01-5% by weight, particularly 0.1-3% by weight, based on the total solids content of the coating composition.

Examples of suitable solvents are alcohols, preferably lower aliphatic alcohols, such as methanol, ethanol, 1-propanol, isopropanol and 1-butanol, ketones, preferably lower dialkyl ketones such as acetone and methyl isobutyl ketone, ethers, preferably lower dialkyl ethers, such as diethyl ether, dibutyl ether and THF, isopropoxyethanol, aromatic hydrocarbons, such as toluene, esters, such as ethyl acetate, butoxyethanol, sulfoxides, sulfones, amides such as dimethylformamide, and mixtures thereof. In principle it is not vital to use a solvent, especially if the hydrolysis of the hydrolyzable silanes leads to the formation of alcohols, such as those specified above, for example. Naturally, however, in that case, too, it is possible to use a solvent.

The hydrolysis or (pre)condensation of the hydrolyzable compounds takes place in particular by the sol-gel process. The sol-gel process is a process familiar to those of skill in the art. The hydrolysis or condensation is conducted either in the absence of a solvent or, preferably, in an aqueous or aqueous/organic reaction medium, optionally in the presence of an acidic or basic condensation catalyst such as HCl, $HNO_3$ or $NH_3$. Partial hydrolysis or (poly)condensation of the hydrolyzable compounds (hydrolysate or precondensate) is obtained. Like the viscosity, the degree of condensation can be adjusted advantageously, by means of the solvent, for example. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990). The resulting sol is used as a coating composition, to which, optionally, further components, such as the copper or silver complex compounds or the nanoscale particles, are added in any order. Such components may also be mixed with the hydrolyzable compounds prior to or during the hydrolysis or precondensation. A further possibility is first to hydrolyze or precondense a hydrolyzable compound and not until later to add further hydrolyzable compound(s) which can be used, such as the fluorosilanes.

The coating composition can be applied to the substrate in any customary way. In this context it is possible to use all common wet-chemical coating techniques. Examples are spincoating, (electro-)dip coating, knife coating, spraying, squirting, spinning, drawing, centrifugation, pouring, rolling, brushing, flowcoating, film casting, blade coating, slot coating, meniscus coating, curtain coating, roller application or customary printing techniques, such as screen printing or flexoprint. The amount of the coating composition applied is chosen such that the desired film thickness is obtained. Operation is carried out, for example, such that dry film thicknesses in the range from 1 to 15 μm and preferably 2 to 5 μm are obtained. One advantage associated with the present invention is the variably adjustable film thickness. Application of the coating composition may be followed by drying, e.g., at ambient temperature (below 40° C.).

The coating, which may have undergone initial drying, is generally subjected to treatment with heat and/or radiation in order to cure the coating. In one preferred embodiment the curing takes place by irradiation. For the irradiation use is made of actinic radiation, e.g., UV or laser beams, or electron beams. Particular preference is given to using UV radiation or blue light, as used in the dental sector, for the irradiation. As a result of the irradiation and/or the heat treatment it is possible to convert copper or silver compounds used into copper or silver colloids.

It has been found that the colloids in the coating composition are formed from the copper or silver compounds, surprisingly, even at very low temperatures. Formation of the colloids begins in particular at temperatures below 200° C., in particular below 130° C., below 100° C. and even below 80° C.; generally a temperature of more than 50° C. is necessary if no irradiation is conducted. Colloid formation begins, for example, in the course of a heat treatment in the range from 50 to 100° C., preferably from 60 to 80° C. or from 70 to 80° C. Such heat treatment of the coating composition may also take place, in one preferred embodiment, before the coating composition is applied, in order to initiate or to complete the formation of colloid. In the course of the subsequent treatment of the applied coating with heat or, preferably, radiation it is possible for colloid formation to be continued if it has not yet been completed.

It is possible to form relatively large colloids, with a diameter for example of 5-20 nm, in particular 10-20 nm, which have a high long-term effect. Surprisingly it has been found that by means of radiation and/or heat treatment copper or silver colloids with a diameter of, for example, from 10 to 30 nm are formed with particular rapidity. The amount of copper or silver compound used in the coating composition is guided by the desired concentration of colloids in the coating, which may amount to several % by weight, for example.

The coating composition can also be cured by heat treatment at temperatures of generally below 300° C., preferably not more than 200° C. and in particular not more than 130° C. Preferred temperatures are those which are also suitable for the colloid formation elucidated above, e.g., below 100° C. or below 80° C., e.g., from 50 to 100° C. or 60 to 80° C. Of course, this heat treatment likewise leads to colloid formation, if they have not already been formed.

Because of the formation of the colloids by irradiation and/or relatively low temperatures it is possible advantageously to prevent rapid curing of the coating, so that the colloids are given time to form. Moreover, the radiation and/or heat treatment for forming the colloids is accompanied by condensation processes and/or crosslinking reactions taking place in the coating, which lead to an increased viscosity, which contributes to stabilizing the colloids.

A coating having an organically modified inorganic matrix is obtained; in other words, in addition to the inorganic matrix framework, there are also organic side groups, which are crosslinked if desired and preferably with one another or by way of organic compounds. The organic side groups are at least partly fluorinated and the matrix contains copper or silver colloids, a combination of the two features leading to a particularly effective biofilm-inhibiting coating which possesses a strong biocidal action even over prolonged periods of time, particularly in conjunction with liquid media, and excellent non-stick properties.

The biofilm-inhibiting coating is suitable generally for all articles or particular parts thereof which are to be protected against the formation of a biofilm. Examples are land vehicles, watercraft and aircraft, such as boats (antifouling), motor vehicles, rail vehicles (including platforms) and airplanes, air conditioning plants, heat exchangers, buildings and parts thereof, such as residential buildings, hospitals, churches, museums, monuments and bridges, particularly internal and external walls (especially where moisture has penetrated), floors, tiles and rooms thereof, pipeline systems, appliances, containers, satellites, machines, furniture, fences, implants, textiles and wooden structures.

The coatings are especially suitable in the field of vehicle construction, including that of boatbuilding, for medical appliances and apparatus, such as incubators, surgical instruments, surgical suture material, implants, vessels, trays, composites, inhalation masks and packaging material, for plant and apparatus for space, such as satellites, spaceships and their equipment, in food technology, e.g., in breweries, butcher's, bakeries, in milk processing, chocolate manufacture and in agriculture, in the kitchen, such as for furniture, surfaces and appliances that are utilized therein, for outdoor equipment, such as garden furniture, wooden structures or fences, generally for the impregnation of textiles, paper, wood and wooden components, in pharmaceuticals or process engineering, for clean-room technology, drinking-water provision, production in accordance with GMP (Good Manufacturing Practice) principles, and for sanitary installations.

DETAILED DESCRIPTION OF THE INVENTION

The example which follows illustrates the invention, without restricting it.

EXAMPLE

1. Preparation of a Base Hydrolysate

A 1 l three-necked flask with thermometer, stirrer and reflux condenser was charged with 248.4 g (1 mol) of 3-methacryloyloxypropyltrimethoxysilane (MPTS), with stirring 99.36 g of acetic-acid-stabilized AlO(OH) (boehmite, Sol P3, Condea) was added and the boehmite was suspended for 10 minutes (MPTS oxide/AlO(OH) ratio=1.8). Subsequently the mixture was heated to 90° C. and stirred for 15 minutes more. Then 35.95 g (2 mol) of distilled water was added slowly with stirring and the mixture was heated to 100° C. After about 5-10 minutes the reaction mixture underwent severe foaming (methanol), at which point the reaction mixture, calculated from the time at which the water was added, was heated for 2.5 h under reflux at an oil bath temperature of 100° C. with stirring. It was then cooled to room temperature and subjected to pressure filtration through a 1 µm membrane filter (cellulose acetate) with a glass fiber prefilter, and kept at −18° C. prior to further use.

2. Preparation of an AgNO$_3$ Solution

A 100 ml round-bottomed flask was charged with 27.0 g of ethanol and 1.28 g (7.5 mmol) of AgNO$_3$ was added. The mixture was stirred at room temperature for 30 minutes and admixed with 14.0 g of 2-propanol and 3.0 g of acetone. The AgNO$_3$ solution was stirred at room temperature in the absence of UV light before being used.

3. Preparation of the Coating Material

In a 500 ml three-necked flask with reflux condenser 100 g of the base hydrolysate was homogenized with 122.3 g of 1-butanol with stirring. 23.5 g of the AgNO$_3$ solution prepared was then added to the mixture, followed by heating to an oil bath temperature of 60° C. After 10 minutes, 0.72 g of N-(2-aminoethyl)-3-aminopropyltrimethoxysilane was added dropwise to the mixture, with vigorous stirring, and the mixture slowly turned brown. The reaction solution was stirred at 60° C. for 24 h. After the solution had been cooled to room temperature, 12.9 g of 1,6-hexanediol dimethacrylate, 1.3 g of leveling agent Byk 306 and 8.3 g (5.5 mol %/mol double bonds) of photoinitiator Irgacure 819 and also 2.5 g of fluorosilane n-C$_6$F$_{13}$—CH$_2$CH$_2$SiZ$_3$, (Dynasil F 8261) were added and the mixture was stirred for 24 h in the absence of UV light. The individual components are listed in Table 1 and the weight fractions of the components in Table 2.

TABLE 1

|  | Coating material |
|---|---|
| Solids content [% by weight] | 35 |
| Base hydrolysate | 100 g |
| 1-Butanol | 122.3 g |
| Comonomer (HDDMA) | 12.9 g |
| Fluorosilane | 2.5 g |
| AgNO$_3$ solution | 23.5 g |
| Byk 306 | 1.3 g |
| Photoinitiator | 8.3 g |

TABLE 2

Weight fractions of the components in the ready-to-use coating material

|  | Coating material |
|---|---|
| MPTS oxide | 17.2 |
| AlO(OH) | 9.1 |
| Acetic acid | 0.5 |
| Water | 3.4 |
| Methanol | 9.2 |
| 1-Butanol | 45.0 |
| Ethanol | 5.2 |
| 2-Propanol | 2.7 |
| Acetone | 0.6 |
| Ag | 0.2 |
| DIAMO | 0.3 |
| Fluorosilane | 0.9 |
| Irgacure 819 | 3.1 |

4. Coating of PMMA Blend Material and Polycarbonate Sheets

The coating material described was applied by brush to a PMMA blend material or to PMMA blend sheets. The leveling properties were investigated. After mechanical tests (water resistance and perspiration resistance tests abrasion resistance) there were brush tests or crockmeter tests.

The coating material described was applied for providing a homogeneous coating surface (e.g., for contact angle measurements) by a spin-coating technique to planar polycarbonate sheets (5×5 cm; thickness 3 mm). A speed of 800 rpm and a spin-coating time of 10 s gave film thicknesses between 4-6 µm (after polymerization).

7. Curing of the Coating Material

The substrates had been provided with a primer coat formed from a conventional coating material. The primer and the coating material were cured using blue light. The primer was cured after a flash-off time of 10 min. (flash-off temperature: 22° C.) under a standard atmosphere for 6 minutes. The coating material was cured after a flash-off time of 10 minutes (flash-off temperature: 22° C.) under an argon atmosphere for 2 minutes.

What is claimed is:

1. A substrate comprising a biofilm-inhibiting coating, wherein the coating comprises
(a) an inorganic condensate that is modified with organic groups, at least a part of the organic groups being fluorine-containing groups selected from one or more of n-C$_6$F$_{13}$CH$_2$CH$_2$, iso-C$_3$F$_7$OCH$_2$CH$_2$CH$_2$, n-C$_8$F$_{17}$CH$_2$CH$_2$, and n-C$_{10}$F$_{21}$CH$_2$CH$_2$, a fraction of fluorinated silanes being more than 2.5% by weight, based on all monomers for making the inorganic condensate,
(b) at least one of a colloid of copper metal and a colloid of silver metal and
(c) nanoscale inorganic particles which are different from a colloid of copper metal and a colloid of silver metal;
and wherein the substrate is selected from parts of: land vehicles, watercraft, aircraft, air conditioning plants, heat exchangers, buildings, pipeline systems, satellites, appliances and apparatus for use in food technology, appliances and apparatus for use in drinking-water provision, appliances and apparatus for use in agriculture, appliances and apparatus for use in a kitchen, furniture, outdoor equipment, fences, wooden structures, equipment for process engineering, and equipment for cleanroom technology.

2. The substrate of claim 1, wherein the coating comprises a colloid of silver metal.

3. The substrate of claim 1, wherein the coating comprises a colloid of copper metal.

4. The substrate of claim 1, wherein not less than 2 mol % and not more than 15 mol % of all non-hydrolyzable groups of hydrolyzable compounds used in a composition for making the coating are fluorine containing groups.

5. The substrate of claim 1, wherein hydrolysable inorganic compounds used for making the inorganic condensate comprise one or more silanes which comprise at least one non-hydrolyzable radical with a functional group which is capable of participating in a crosslinking reaction and comprises a carbon-carbon double bond.

6. The substrate of claim 5, wherein the functional group is selected from one or more of vinyl, (meth)acryloyl, and (meth)acryloyloxy.

7. The substrate of claim 5, wherein the one or more silanes comprise at least one of vinyltriethoxysilane, vinyltrimethoxysilane, methacryloyloxypropyl-trimethoxysilane, methacryloyloxypropyltriethoxysilane, acryloyloxypropyltrimethoxysilane, and acryloyloxypropyltriethoxysilane.

8. The substrate of claim 1, wherein the inorganic condensate comprises at least one of Si, Al, Ti and Zr.

9. The substrate of claim 1, wherein the nanoscale inorganic particles (c) comprise at least one of $SiO_2$, $Al_2O_3$, ITO, ATO, AlOOH, $ZrO_2$ and $TiO_2$.

10. The substrate of claim 9, wherein the nanoscale inorganic particles have a particle size of from 2 nm to 50 nm.

11. The substrate of claim 1, wherein the substrate further comprises a base coat beneath the biofilm-inhibiting coating.

12. The substrate of claim 1, wherein the coating has a thickness of from 1 μm to 15 μm.

13. The substrate of claim 1, wherein the substrate comprises a boat hull.

14. The substrate of claim 1, wherein the substrate comprises a part of a motor vehicle.

15. The substrate of claim 1, wherein the substrate comprises a part of a rail vehicle.

16. The substrate of claim 1, wherein the substrate comprises a part of an airplane.

17. The substrate of claim 1, wherein the substrate comprises an external or internal wall or a part thereof.

18. The substrate of claim 1, wherein the substrate comprises a tile.

19. The substrate of claim 1, wherein the substrate comprises a part of an appliance or apparatus for use in a brewery.

20. The substrate of claim 1, wherein the substrate comprises a part of an appliance or apparatus for use by a butcher.

21. The substrate of claim 1, wherein the substrate comprises a part of an appliance or apparatus for use in a bakery.

22. The substrate of claim 1, wherein the substrate comprises a part of an appliance or apparatus for use in milk processing.

23. The substrate of claim 1, wherein the substrate comprises a part of an appliance or apparatus for use in chocolate manufacture.

24. The substrate of claim 1, wherein the substrate comprises a part of an appliance or apparatus for use in agriculture.

25. The substrate of claim 1, wherein the substrate comprises a part of an appliance or apparatus for use in drinking water provision.

26. The substrate of claim 1, wherein the substrate comprises a part of an appliance or apparatus for use in a kitchen.

27. The substrate of claim 1, wherein the substrate comprises a part of a piece of furniture.

28. The substrate of claim 1, wherein the substrate comprises a part of outdoor equipment.

29. A process for producing a substrate having a biofilm-inhibiting coating, the process comprising applying a coating composition to at least a part of a surface of the substrate and subjecting the applied coating composition to at least one of heat and radiation, wherein the coating composition comprises
(a) at least one of a hydrolysate and a precondensate of one or more hydrolyzable inorganic compounds which comprise at least one non-hydrolyzable organic substituent, not less that 2 mol % of all non-hydrolyzable groups of the one or more hydrolyzable inorganic compounds being groups containing one or more fluorine atoms, and
(b) one or more complex compounds of at least one of copper and silver that are capable of being converted to a colloid of at least one of copper and silver when subjected to at least one of heat and radiation, the one or more complex compounds comprising at least one aminosilane;
and wherein the substrate is selected from parts of: land vehicles, watercraft, aircraft, air conditioning plants, heat exchangers, buildings, pipeline systems, satellites, appliances and apparatus for use in food technology, appliances and apparatus for use in drinking-water provision, appliances and apparatus for use in agriculture, appliances and apparatus for use in a kitchen, furniture, outdoor equipment, fences, wooden structures, equipment for process engineering, and equipment for cleanroom technology.

30. The process of claim 29, wherein the one or more hydrolyzable inorganic compounds comprise one or more silanes which comprise at least one non-hydrolyzable radical with a functional group which is capable of participating in a crosslinking reaction and comprises a carbon-carbon double bond.

31. The substrate of claim 30, wherein the functional group is selected from one or more of vinyl, (meth)acryloyl, and (meth)acryloyloxy.

32. The process of claim 29, wherein the coating composition is subjected to heat.

33. The process of claim 30, wherein the coating composition is subjected to radiation.

34. The process of claim 33, wherein the radiation comprises at least one of UV radiation and blue light.

35. The process of claim 29, wherein the coating composition is applied in an amount which results in a dry thickness of the biofilm-inhibiting coating of from 2 μm to 5 μm.

36. The process of claim 29, wherein the substrate comprises a boat hull.

37. The process of claim 29, wherein the substrate comprises a part of a motor vehicle.

38. The process of claim 29, wherein the substrate comprises a part of a rail vehicle.

39. The process of claim 29, wherein the substrate comprises a part of an airplane.

40. The process of claim 29, wherein the substrate comprises an external or internal wall or a part thereof.

41. The process of claim 29, wherein the substrate comprises a tile.

42. The process of claim 29, wherein the substrate comprises a part of an appliance or apparatus for use in a brewery.

43. The process of claim 29, wherein the substrate comprises a part of an appliance or apparatus for use by a butcher.

44. The process of claim 29, wherein the substrate comprises a part of an appliance or apparatus for use in a bakery.

45. The process of claim 29, wherein the substrate comprises a part of an appliance or apparatus for use in milk processing.

46. The process of claim 29, wherein the substrate comprises a part of an appliance or apparatus for use in agriculture.

47. The process of claim 29, wherein the substrate comprises a part of an appliance or apparatus for use in drinking water provision.

48. The process of claim 29, wherein the substrate comprises a part of an appliance or apparatus for use in a kitchen.

49. The process of claim 29, wherein the substrate comprises a part of a piece of furniture.

50. The process of claim 29, wherein the substrate comprises a part of outdoor equipment.

51. A process for producing a substrate having a biofilm-inhibiting coating, the process comprising applying a coating composition to at least a part of a surface of the substrate and subjecting the applied coating composition to at least one of heat and radiation, wherein the coating composition comprises
   (a) at least one of a hydrolysate and a precondensate of one or more hydrolyzable inorganic compounds which comprise at least one non-hydrolyzable organic substituent selected from one or more of n-$C_6F_{13}CH_2CH_2$-, iso-$C_3F_7OCH_2CH_2CH_2$-, n-$C_8F_{17}CH_2CH_2$-, and n-$C_{10}F_{21}CH_2CH_2$-, a fraction of fluorinated silanes being more than 2.5% by weight, based on all monomers for making the at least one of a hydrolysate and a precondensate,
   (b) at least one of
      (i) a colloid of at least one of a colloid of silver metal and a colloid of copper metal, and
      (ii) one or more compounds of at least one of silver and copper that are capable of being converted to (i) when subjected to at least one of heat and radiation, and
   (c) nanoscale inorganic particles which are different from a colloid of silver metal and a colloid of copper metal;
   and wherein the substrate is selected from parts of: land vehicles, watercraft, aircraft, air conditioning plants, heat exchangers, buildings, pipeline systems, satellites, appliances and apparatus for use in food technology, appliances and apparatus for use in drinking-water provision, appliances and apparatus for use in agriculture, appliances and apparatus for use in a kitchen, furniture, outdoor equipment, fences, wooden structures, equipment for process engineering, and equipment for clean-room technology.

52. The process of claim 51, wherein the one or more hydrolyzable inorganic compounds comprise one or more silanes which comprise at least one non-hydrolyzable radical with a functional group which is capable of participating in a crosslinking reaction and comprises a carbon-carbon double bond.

53. The process of claim 52, wherein the functional group is selected from one or more of vinyl, (meth)acryloyl, and (meth)acryloyloxy.

54. The process of claim 52, wherein the one or more silanes comprise at least one of vinyltriethoxysilane, vinyltrimethoxysilane, methacryloyloxypropyl-trimethoxysilane, methacryloyloxypropyltriethoxysilane, acryloyloxypropyltrimethoxysilane, and acryloyloxypropyltriethoxysilane.

55. The process of claim 52, wherein the coating composition is applied in an amount which results in a dry thickness of the biofilm-inhibiting coating of from 2 μm to 5 μm.

56. The process of claim 29, wherein not less that 4 mol % of all non-hydrolyzable groups of the one or more hydrolyzable inorganic compounds for making the at least one of a hydrolysate and a precondensate (a) are groups containing one or more fluorine atoms.

* * * * *